United States Patent
Liu et al.

(10) Patent No.: US 11,938,875 B2
(45) Date of Patent: Mar. 26, 2024

(54) SYSTEM AND METHOD FOR WIRELESS POWER TRANSFER AND DATA MODULATION FOR VEHICLES

(71) Applicants: Toyota Motor Engineering & Manufacturing North America, Inc., Plano, TX (US); The Regents Of The University Of Michigan, Ann Arbor, MI (US)

(72) Inventors: Yanghe Liu, Ann Arbor, MI (US); Chungchih Chou, Ann Arbor, MI (US); Hiroshi Ukegawa, South Lyon, MI (US); Qunfang Wu, Westland, MI (US); Mengqi Wang, Troy, MI (US); Weiyang Zhou, Westland, MI (US)

(73) Assignees: TOYOTA MOTOR ENGINEERING & MANUFACTURING NORTH AMERICA, INC., Plano, TX (US); THE REGENTS OF THE UNIVERSITY OF MICHIGAN, Ann Arbor, MI (US)

(*) Notice: Subject to any disclaimer, the term of this patent is extended or adjusted under 35 U.S.C. 154(b) by 543 days.

(21) Appl. No.: 17/164,166

(22) Filed: Feb. 1, 2021

(65) Prior Publication Data
US 2022/0194306 A1    Jun. 23, 2022

Related U.S. Application Data

(60) Provisional application No. 63/127,349, filed on Dec. 18, 2020.

(51) Int. Cl.
*B60R 16/023*    (2006.01)
*B60R 16/03*    (2006.01)
(Continued)

(52) U.S. Cl.
CPC ............ *B60R 16/023* (2013.01); *B60R 16/03* (2013.01); *H02J 50/40* (2016.02); *H02J 50/80* (2016.02); *H04B 1/02* (2013.01)

(58) Field of Classification Search
CPC ........ B60R 16/023; B60R 16/03; H02J 50/40; H02J 50/80; H02J 7/02; H02J 50/10;
(Continued)

(56) References Cited

U.S. PATENT DOCUMENTS 9,731,614 B1 *   8/2017   Sarwat ................... B60L 53/12
9,987,937 B1 *   6/2018   Mohamed ............... H02J 50/12
(Continued)

FOREIGN PATENT DOCUMENTS

CN    103560574 A    2/2014
CN    105048650 B    5/2017
(Continued)

OTHER PUBLICATIONS

Ciprian Antaloae, Nicholas Vaughan, and James Marco, Investigation of High Frequency AC Power Distribution Benefits for the Automobile Auxiliary Electrical System, Apr. 12, 2010, SAE International (Year: 2010).*
(Continued)

*Primary Examiner* — Jared Fureman
*Assistant Examiner* — Michael J Warmflash
(74) *Attorney, Agent, or Firm* — DINSMORE & SHOHL LLP (57) ABSTRACT

Systems and methods are provided for wireless power transfer in a vehicle. A wireless power transfer system can include a high-frequency alternating current (HFAC) inverter electrically coupled to the power source and a transmitter to wirelessly transmit a HFAC power signal to at least one device of a vehicle, such as sensors (e.g., LiDAR, GPS etc.) and cameras. The HFAC power signal provides
(Continued)

wireless power and a data signal to the at least one device of a vehicle. The wireless power transfer system can eliminate the need for cabling and wires to provide power to the device. Wireless power transfer can include use or a data modulation circuit and a pulse current source to inject a pulse current to the HFAC power signal as superimposed data. System configurations can power a plurality of devices. Systems can includes a plurality of HFAC inverters and transmitters to power multiple sets of devices.

20 Claims, 8 Drawing Sheets

(51) Int. Cl.
*H02J 50/40* (2016.01)
*H02J 50/80* (2016.01)
*H04B 1/02* (2006.01)

(58) Field of Classification Search
CPC ...... H02J 50/005; H02J 7/00036; H04B 1/02; H02M 3/33569
See application file for complete search history.

(56) References Cited

U.S. PATENT DOCUMENTS

| | | | |
|---|---|---|---|
| 2012/0287985 A1* | 11/2012 | Okamura | H04L 25/02 375/300 |
| 2015/0001958 A1* | 1/2015 | Abe | B60L 53/22 307/104 |
| 2015/0102774 A1* | 4/2015 | DiGuardo | H02J 7/00 320/108 |
| 2016/0126750 A1* | 5/2016 | Yasuda | B60L 53/126 307/104 |
| 2018/0342792 A1* | 11/2018 | Hashizume | G02F 1/133308 |
| 2018/0345792 A1 | 12/2018 | Liu et al. | |
| 2020/0062138 A1* | 2/2020 | Smolenaers | B60L 55/00 |
| 2021/0370788 A1* | 12/2021 | Pantic | H02J 50/90 |
| 2022/0181919 A1* | 6/2022 | Chou | H02J 50/402 |
| 2022/0247331 A1* | 8/2022 | Liu | H02P 5/46 |

FOREIGN PATENT DOCUMENTS

| | | |
|---|---|---|
| CN | 110329101 A | 10/2019 |
| JP | 5494220 B2 | 5/2015 |
| JP | 5747446 B2 | 7/2015 |
| WO | 2017088803 A1 | 6/2017 |

OTHER PUBLICATIONS

Ciprian Antaloae, Nicholas Vaughan, and James Marco, Investigation of high frequency AC power distribution benefits for the automobile auxiliary electrical system, SAE Int. J. Passeng. Cars—Electron. Elect. Syst., vol. 3, pp. 109-121, Published Apr. 12, 2010, 13 pages.

Brvision IP69K brake light rear view camera for fiat ducato (https://micbrvision.en.made-in-china.com/product/kCOQmirJsUcP/China- Brvision-IP69K-Brake-Light-Rear-View-Camera-for-FIAT-Ducato.html), published Apr. 10, 2020, 2 pages.

* cited by examiner

SYSTEM AND METHOD FOR WIRELESS POWER TRANSFER AND DATA MODULATION FOR VEHICLES

CROSS-REFERENCE TO RELATED APPLICATION

This application claims priority to U.S. Provisional Patent Application No. 63/127,349, filed Dec. 18, 2020, for "System And Method For Wireless Power Transfer And Data Modulation For Vehicles," which is hereby incorporated by reference in its entirety including the drawings.

TECHNICAL FIELD

Embodiments described herein generally relate to power transfer in a vehicle and, more specifically, to systems and methods for power transfer to wireless power vehicle components and provide data with power transfer.

BACKGROUND

Vehicles, and in particular autonomous vehicles, employ many sensors that draw significant power. As autonomous vehicles and autonomous operations become more prevalent in vehicles, the electrical load and vehicle power requirements will increase. The auxiliary load profile will also increase and more auxiliary power will be required. For current vehicles, a power increase would require more transmission wires to supply energy. Placement and distribution of additional devices may also generate new design requirements and improvements in power configurations. Adding wires and cables can introduce significant electrical losses and add weight to a vehicle. There exists a need for improved power systems for a vehicle. There also exists a need for improved methods of providing power and data to sensors and components of a vehicle.

SUMMARY

Systems and methods for wireless power transfer in a vehicle are described. One embodiment of a wireless power transfer system for a vehicle includes an electrical power source includes at least one battery unit, a high-frequency alternating current (HFAC) inverter electrically coupled to the power source, a transmitter electrically coupled to the HFAC inverter, and a controller electrically coupled to the HFAC inverter and the transmitter. The controller is configured to enable the HFAC inverter and the transmitter, and control the HFAC inverter and the transmitter to wirelessly transmit a HFAC power signal to at least one device of a vehicle, wherein the HFAC power signal provides wireless power to the at least one device. The controller is also configured to control modulation of the HFAC power signal to provide a data signal to the at least one device of a vehicle.

In one embodiment, the battery unit is coupled to the HFAC inverter by a direct current (DC) transmission line.

In one embodiment, the HFAC inverter converts DC power received from the at least on battery unit to a high frequency AC power signal.

In one embodiment, the transmitter is configured to generate a high frequency electric field to wirelessly power the at least one device.

In one embodiment, the transmitter includes a data modulation circuit using a pulse current source to inject a pulse current to the HFAC power signal, wherein data is superimposed on a transmitted HFAC power signal.

In one embodiment, controlling the HFAC inverter and transmitter for wireless power output includes activating the at least one device of the vehicle.

In one embodiment, the system further includes at least one additional high-frequency alternating current (HFAC) inverter electrically coupled to the power source and at least one additional transmitter electrically coupled to the at least one additional HFAC inverter, wherein the at least one additional HFAC inverter and the at least one additional transmitter provide an additional HFAC power signal to provide and data to at least one additional device of a vehicle.

In one embodiment, the data signal activates the at least one device of the vehicle for operation.

In one embodiment, the controller is configured to deactivate power to the at least one device of the vehicle.

In another embodiment, a vehicle system includes a power source including at least one battery unit, a high-frequency alternating current (HFAC) inverter electrically coupled to the power source, a transmitter electrically coupled to the HFAC inverter, at least one device; and a controller electrically coupled to the HFAC inverter and the transmitter. The controller is configured to enable the HFAC inverter and the transmitter, and control the HFAC inverter and the transmitter to wirelessly transmit a HFAC power signal to at least one device of a vehicle, wherein the HFAC power signal provides wireless power to the at least one device. The controller is also configured to control modulation of the HFAC power signal to provide a data signal to the at least one device of a vehicle.

In one embodiment, the battery unit is coupled to the HFAC inverter by a direct current (DC) transmission line, and wherein the DC transmission line is coupled to a plurality of HFAC inverters.

In one embodiment, the HFAC inverter converts DC power received from the at least on battery unit to a high frequency AC power signal.

In one embodiment, the transmitter is configured to generate a high frequency electric field to wirelessly power the at least one device.

In one embodiment, the transmitter includes a data modulation circuit using a pulse current source to inject a pulse current to the HFAC power signal, wherein data is superimposed on a transmitted HFAC power signal.

In one embodiment, controlling the HFAC inverter and transmitter for wireless power output includes activating the at least one device of the vehicle.

In one embodiment, the system includes at least one additional high-frequency alternating current (HFAC) inverter electrically coupled to the power source and at least one additional transmitter electrically coupled to the at least one additional HFAC inverter, wherein the at least one additional HFAC inverter and the at least one additional transmitter provide an additional HFAC power signal to provide and data to at least one additional device of a vehicle.

In one embodiment, the data signal activates the at least one device of the vehicle for operation.

In one embodiment, the controller is configured to deactivate power to the at least one device of the vehicle.

In one embodiment, the at least one device comprises at least one of a sensor, camera and vehicle device in general.

Another embodiment is directed to a method for controlling wireless power transfer for a vehicle. The method includes enabling, by a controller, a high-frequency alternating current (HFAC) inverter electrically coupled to a power source and a transmitter, and controlling, by the controller, the HFAC inverter and the transmitter to wirelessly transmit a HFAC power signal to at least one device of a vehicle, wherein the HFAC power signal provides wireless power to the at least one device. The method also includes controlling, by the controller, modulation of the HFAC power signal to provide a data signal to the at least one device of a vehicle.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments of the present disclosure are directed to power transfer in vehicles and transfer of power with an integrated data signal. Vehicles can employ several sensors that draw significant power. Future vehicle configurations are expected to require additional sensors and devices. By way of example, future vehicles are expected to require sensors and processing units for advanced functions such as autonomous driving. Autonomous vehicles and autonomous functions may require use of several sensors at various locations of a vehicle, including, for example, global positioning system (GPS) devices, light detection and ranging (LiDAR), radio detection and ranging (RADAR), global navigation satellite system (GNSS), inertial measurement unit (IMU), cameras, and computer processors. These configurations will likely require an increase of energy output by a vehicle based on device consumption and to allow for vehicle control. Embodiments of the disclosure are directed to systems and methods for wireless power transfer to vehicle devices. Systems and methods provided herein can reduce the required number of power cables to vehicle devices, as well as reduce other components such as electrical couplers. A reduction in cables and couplers may lead to weight savings. Embodiments are also directed to power transfer with an integrated data signal. By providing data signals, such as control signals, data-carrying conductors within portions of a vehicle (or other device/system) may also be reduced. Embodiments include providing power and data to vehicle devices by modulating a data signal on top of a high-frequency alternating current (HFAC) waveform. Advantages of wireless power transfer include flexible, convenient, autonomous charging, and elimination of electrical cables, connectors, and plugs. As used herein power relates to providing electrical power for a device to operate. Power signals output to devices may also be used for charging devices.

System configurations are provided for vehicles to provide wireless power transfer to one or more regions of the vehicle including one or more devices. Methods are described to enable power output, control power output, and disable power output. Embodiments include methods and system configurations for modulating a data signal on a high-frequency alternating current (HFAC) power signal that is used to power devices by a wireless connection.

Figure 1A:
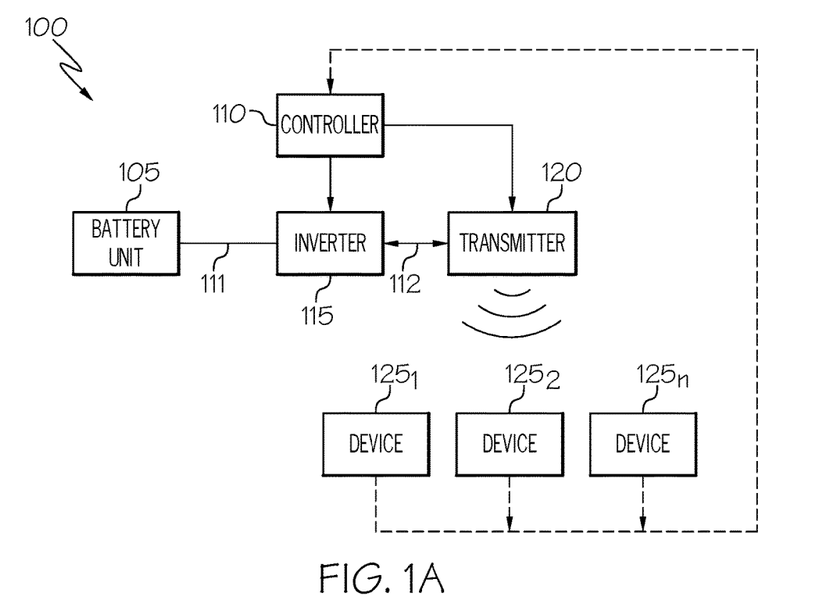
FIG. 1A depicts an example wireless power transfer system for a vehicle, according to embodiments described herein.

Referring now to the drawings, FIG. 1A depicts an example wireless power transfer system 100 according one or more embodiments. Systems as described herein may interoperate with components of a vehicle. By way of example, system 100 may provide power and data to one or more vehicle devices. To that end, systems described herein may be configured to provide auxiliary power to a plurality of devices associated with a vehicle.

System 100 is a wireless power transfer system for a vehicle. According to embodiments described herein, system 100 includes battery unit 105, controller 110, high-frequency alternating current (HFAC) inverter 115, and transmitter 120. System 100 can provide power wirelessly to at least one device, such as devices $125_{1-n}$.

As shown in FIG. 1A, battery unit 105 is coupled to the HFAC inverter 115 by a direct current (DC) transmission line 111. Battery unit 105 may be an electrical power source within a vehicle, such as the main battery unit, an auxiliary battery unit, or electrical power source in general. Battery unit 105 may be part of a vehicle auxiliary power supply system to power devices $125_{1-n}$, which may include sensors and vehicle components. HFAC inverter 115 converts DC power from battery unit 105 into a high frequency AC power signal. The HFAC power signal may have frequency within the range of 50 H to 1000 Hz. A HFAC bus conductor 112 is electrically coupled to transmitter 120 to electrically couple transmitter 120 to HFAC inverter 115. Transmitter 120 may include a transmitter coil to generate and output a high frequency electric field to wirelessly power at least one of devices $125_{1-n}$. The electric field may be received by integrated receivers of devices $125_{1-n}$. As system 100 is configured to provide a data signal with wireless power, transmitter 120 may also include a data modulation circuit using a pulse current source to inject a pulse current to the output HFAC power signal, wherein data is superimposed on a transmitted HFAC power signal. The data may be superimposing to the transmitted HFAC power signal as current peaks.

Controller 110 is electrically coupled to HFAC inverter 115 and transmitter 120, and can direct operation of system 100 including operations of HFAC inverter 115 and transmitter 120. By way of example, controller 100 is configured to enable HFAC inverter 115 and the transmitter 120. Controller 110 can also control HFAC inverter 115 and transmitter 120 to wirelessly transmit a HFAC power signal to at least one of devices $125_{1-n}$. In that fashion, an HFAC power signal can provide wireless power to at least one of device $125_{1-n}$. Controller 110 can also control modulation of a HFAC power signal to provide a data signal to at least one of devices $125_{1-n}$. One or more elements of system 100, such as controller 110, may optionally receive one or more of feedback, data and output from devices $125_{1-n}$ by way of a wireless communication. Sensor output, such as images detected objects, position data may be communicated by one or more of a wired and wireless links for controllers to utilize and/or process device data. By way of example, sensors for autonomous driving may communicate data to controller 110 or an electronic control unit (ECU) of a vehicle.

System 100 can be employed as a wireless charging network and integrated auxiliary power supply system of a vehicle. References and operations for providing power may also be used to charged vehicle devices. By using a wireless charging configuration, the need for many individual conductors to power the individual sensors may be eliminated. System 100 may be employed in a vehicle with several devices, such that devices $125_{1-n}$ may relate to one or more of sensors, such as global positioning system (GPS), light detection and ranging (LiDAR), radio detection and ranging (RADAR), global navigation satellite system (GNSS), inertial measurement unit (IMU), cameras, and computer processors. In embodiments, devices $125_{1-n}$ include receivers to convert HFAC power signals into DC power to power device operation. Devices $125_{1-n}$ may have integrated AC/DC converters to directly receive the HFAC power.

Figure 1B:
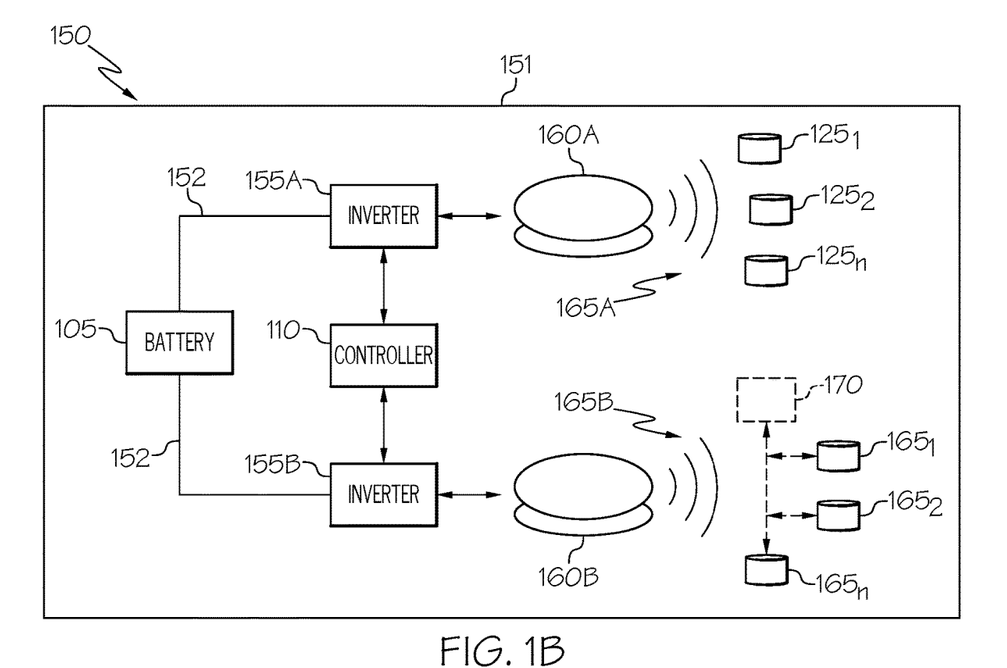
FIG. 1B depicts an example vehicle system, according to embodiments described herein.

FIG. 1B depicts vehicle system 150 according to another embodiment. System 150 includes a plurality of transmission lines from battery unit 105, the electrical power source of a vehicle. Compared to system 100, system 150 includes an additional high-frequency alternating current (HFAC) inverter electrically coupled to the power source and at least one additional transmitter electrically coupled to the at least one additional HFAC inverter. System configurations described herein may be provided for multiple regions of a vehicle to allow for a plurality of HFAC inverter and transmitter pairs. System 150 includes battery unit 105, controller 110, high-frequency alternating current (HFAC) inverters 155A, 155B, and transmitters 160A, 160B. System 150 can provide power wirelessly to a plurality devices, including devices in different regions or groupings. As shown in FIG. 1B, transmitter 160A is configured to output wireless power 165A to devices $125_{1-n}$ and to output wireless power 165B devices $125_{1-n}$. Similar to system 100, inverters 155A, 155B, are coupled to battery unit 105. HFAC inverters 165A, 165B converts DC power, from battery unit 105, into a high frequency AC power signal. HFAC inverters 165A, 165B are electrically coupled to and transmitters 160a, 160B, respectively. Transmitters 160A, 160B may each include transmitter coils to generate and output a high frequency electric field to wireless power at least one of devices $125_{1-n}$, and $125_{1-n}$. The electric field may be received by integrated receivers of devices $125_{1-n}$. According to embodiments, system 150 may include receiver 170 configured to receive an HFAC signal and to converted the HFAC signal to DC output for devices $125_{1-n}$.

Devices $125_{1-n}$ are an additional group of devices that may be controlled by controller 110. Transmitters 160A, 160B may each include coils that are located to service the position and location of devices $125_{1-n}$. Systems as described herein allow for a vehicle to power additional devices and to expand auxiliary load profile of a vehicle. By providing increased auxiliary power, multiple devices can be serviced and additional devices can be accommodated.

FIGS. 1A and 1B illustrate configurations with one and two transmission lines, respectively, to groupings of devices. It should be appreciated that systems described herein can include multiple transmission lines to service a plurality of device regions. By way of example, a vehicle may include power transmission to service regions associated with the four corners of the vehicle, such as front left, front right, back left and back right. Alternatively devices may be associated with each of front, left, right and rear positions of a vehicle. According to embodiments, systems can include coupling of the battery unit 105 to a DC bus transmission line 111 which powers four HFAC inverters. Each of the HFAC inverters may power a separate transmitter having a transmitter coil to produce an electrical field is received by devices.

Figure 2:
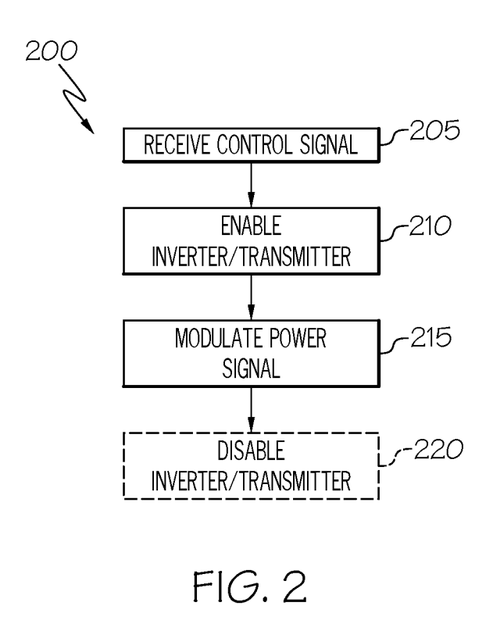
FIG. 2 depicts an example process for controlling wireless power transfer for a vehicle, according to embodiments described herein.

FIG. 2 depicts a process for controlling wireless power transfer according to embodiments descried herein. Process 200 may be performed by a system (e.g., system 100, system 150) and/or devices as described herein to provide power transfer with an integrated data function. Process 200 may also provide operations for modulating a data signal on a high-frequency alternating current (HFAC) power signal that is used to power devices by wireless connection.

Process 200 may be initiated by receiving a control signal at block 205. A controller 110 of a system (e.g., system 100, system 150) can receive or generate a command to enable one or more devices of a vehicle. By way of example, the vehicle system may provide a control command requiring activation of at least one vehicle device, such as a sensor for an autonomous operation or vehicle operation in general. Commands for controller 110 may be received from one or more control units of a vehicle, such as a vehicle electronic control unit. Commands at block 205 may be generated based on the operational state of a vehicle, such that sensors associated with an operational state may be activated when required for vehicle operation. At block 210, controller 110 may enable a HFAC inverter and transmitter. For example, at block 210 the HFAC inverter may be energized by a power source, such as battery unit 105. Once energized the HFAC inverter may also output a HFAC power signal to the transmitter. The controller may activate power from a battery unit 105 to enable HFAC inverter 115 and transmitter 120. Once a transmitter of system 100 is enabled, power can be transmitted. Process 200 may also include controlling, by the controller 110, the HFAC inverter and the transmitter to wirelessly transmit a HFAC power signal to at least one device of a vehicle.

At block 215, the controller may control modulation of HFAC power output to at least one device of a vehicle. The power signal may be modulated to provide data integrated with the power transmission. Integration of data may be based on injection of a source current as described below with reference to FIGS. 3 and 4. By providing data with the HFAC power signal, both data and power may be provided wirelessly. Data signals may be used by a vehicle controller to activate or control operation of one or more devices. Embodiments include controlling modulation of a power signal to provide a data signal to activate at least one device of the vehicle, such as a device that is in a low powered state.

The power signal can be modulated with input data values for output of a data signal that may be detected by the vehicle devices. In addition to activation of devices, data signals may be used to control deactivation. For example, controller 110 may optionally disable one or more devices with a data signal interrogated to an HFAC power signal. By way of example, at least one device, in a group of devices powered by an HFC signal may be deactivated while other devices continue to receive power. For multiple devices receiving power for a transmitter, data signals may be used by the system to enable a device that is in a low power mode, or disable a device to enter a low power mode. As such, at least one device may be awakened and/or disabled while power is transmitted to multiple device. Process 200 may optionally include disabling the HFAC inverter and the transmitter at block 220. Power will not be provided to vehicle devices receiving power from a disabled HFAC inverter and transmitter.

Figure 3:
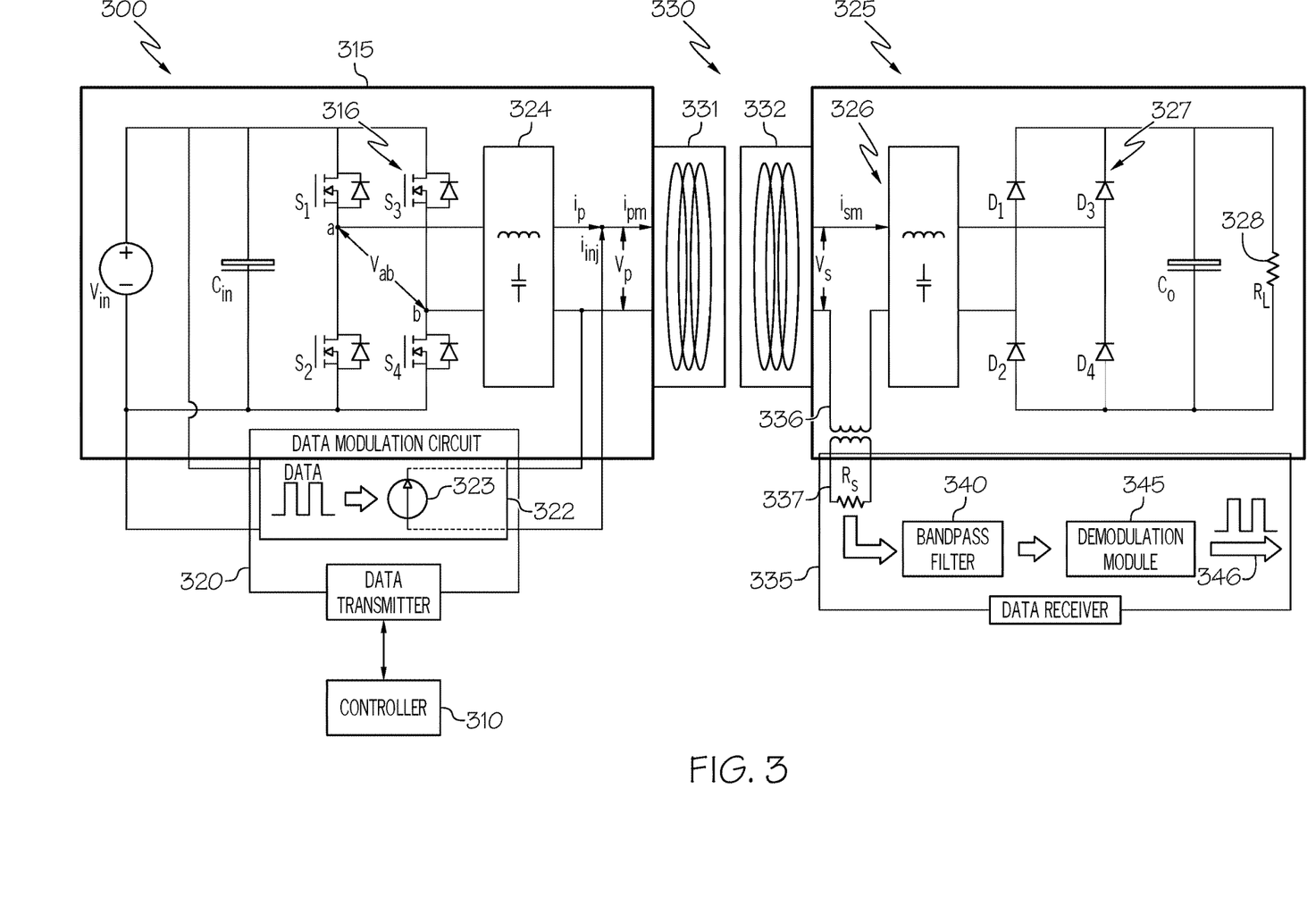
FIG. 3 depicts a graphical representation of an example wireless power transfer circuit, according to embodiments described herein.

FIG. 3 depicts a graphical representation of a wireless power transfer circuit configuration. Circuit configuration 300 is a capacitive power data modulation circuit that may be employed by systems described herein, including system 100 and system 150. As shown, circuit configuration 300 includes controller 310, HFAC inverter 315, and transmitter 320 associated with a primary side of circuit configuration 300, and device 325 is associated with a secondary side. HFAC inverter 315 is represented by a high-level schematic of a HFAC circuit (i.e., a DC to AC converter). Transmitter 320 includes data modulation circuit 322 interconnected to HFAC inverter 315. Data modulation circuit 322 may use a pulse current source to inject a pulse current to a HFAC power signal such that data is superimposed on a transmitted HFAC power signal. Circuit configuration 300 may also include coupling interface 330 for power transfer to device 325. Coupling interface 330 includes coil 331 associated with transmission from the primary side of circuit configuration 300 and coil 332 associated with receiving by the secondary side of circuit configuration 300. Transmitter 320 may feed transmission coil 331 an HFAC power signal for transmission to coil 332 of device 325. Circuit configuration 300 may also include a full bridge inverter formed by switches 316 (e.g., S1-S4), compensation network 324, and coupling interface 330. Controller 310 may provide one or more signals to enable operation of HFAC inverter 315 and transmitter 320. The control signals can include activation, and deactivating HFAC inverter 315 and transmitter 320.

Figure 4:
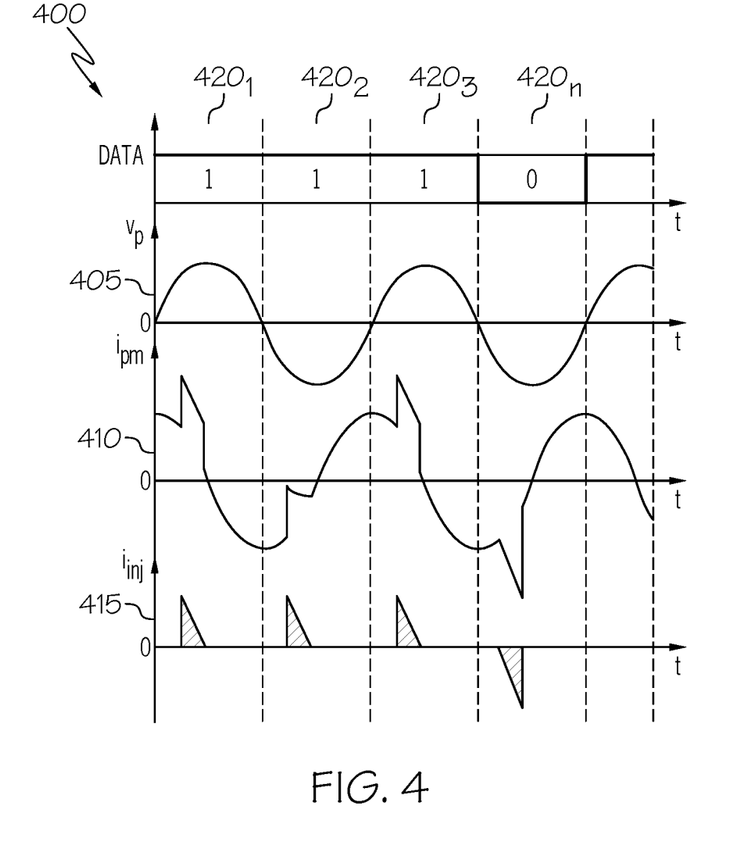
FIG. 4 is a graphical representation of example waveforms, according to embodiments described herein.
Figure 5:
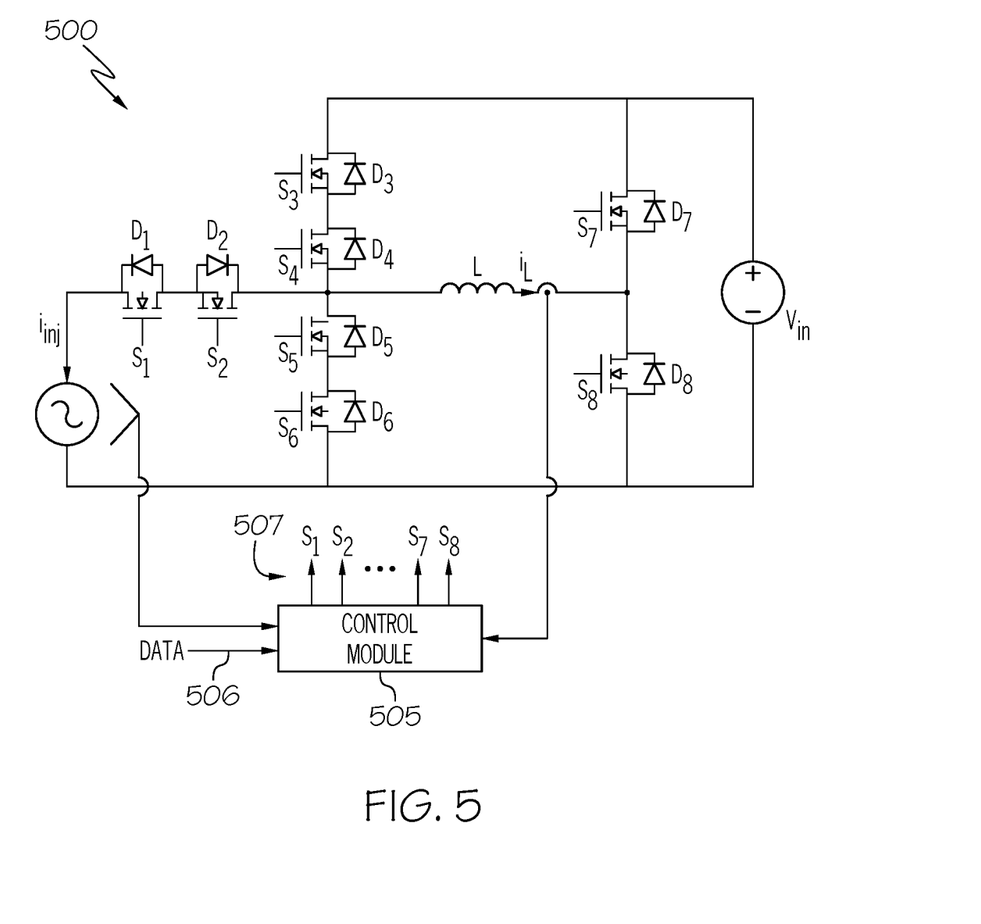
FIG. 5 depicts a graphical representation of an example data modulation circuit, according to embodiments described herein.

According to embodiments described herein, circuit configuration 300 provides a capacitive power data modulation circuit to modify HFAC signals to represent values (e.g., ones and zeros, etc.) of a data signal. Circuit configuration 300 may provide a wireless power transfer system with high data rate communication on a shared channel. Controller 310 may provide data and/or commands to modulate power signals output by transmitter 320. Modulation commands may be based on the data to transmit to a device. Data modulation circuit 322 may be controlled by data transmitter 320 to selectively apply injector current $i_{inj}$. As discussed in more detail below, the data signal may be modulated on a high-frequency alternating current (HFAC) power signal that is used to power device 325 by a wireless connection. An injector current ($i_{inj}$) source 323 is used to charge capacitors of compensation network 324 to modify a HFAC voltage signal. FIG. 4 illustrates an example HFAC waveform 405 and modified current waveform ($i_p$) 410. Compensation network 324 may function to convert a HFAC power into a HFAC signal suitable for transmission by transmitter 320. Discussed below with reference to FIG. 5 are multiple modes for operating data modulation circuit 322.

Device 325 includes a circuit components 326 to receive a HFAC signal and power load 328. Circuit components 326 represent a high-level schematic of a HFAC circuit (e.g., a AC to DC converter). Device 325 also includes a rectifier formed by diodes 327 (e.g., D1-D4). Device 325 also includes receiver 335 including a bandpass filter 340 and demodulation receiver 335 configured to detect and output data 346. Bandpass filter 340 is configured to isolate the transmitted HFAC signal. Demodulation receiver 345 is configured to extract current pluses from the HFAC signal to provide a data signal. According to some embodiments, timing of the transmitted HFAC signal may be used to demodulate injected current pulses. Device 325 may relate to a vehicle device, such as a sensor, camera, etc., and may include other elements to function (e.g., imaging sensor, position sensor, etc.) not shown in FIG. 3. Alternatively, device 325 may be used a receiver (e.g., receiver 170) within a vehicle system to power one or more other devices.

Circuit configuration 300 may provide a high rate communication by using multiple signal branches having direct connections on each side of the system. The primary side includes transmitter 320 formed by a bidirectional DC/DC converter, which serves as a data modulation circuit 322. Receiver 355 at a secondary side is formed by a highly coupled transformer ($T_j$) 336 and a detection resistor (Rs) 337, a bandpass filter 340, and a demodulation module 345. Data modulation circuit 322 includes pulse current source 323 to inject current. Each data bit is represented by a pulse current, which generated by the bidirectional DC/DC converter. The data is directly injected into the power current $i_p$, as such the power signal may also function as a data carrier. The modulated current carrier is transferred from the primary side to the second side via the capacitive channel of coupling interface 330. Modulated current is picked up and detected by transformer ($T_j$) 336 and detection resistor (Rs) 337. By filtering and demodulating the voltage waveform of the detection resistor, the signal can be restored.

FIG. 3 illustrates a single device 325 configured to receive power from coupling interface 330; however it should be appreciated that multiple devices may be configured to receive power by way of coupling interface 330. Each device associated with coupling interface 330 may be configured to receive power and an integrated data signal to determine control operations including activation of sensing capabilities, transmission of detected data, and/or transmission of detected states/conditions to a vehicle controller. In embodiments, device 325 may provide a detected data signal to other devices (e.g., devices $125_{1-n}$) associated with its location. By way of example a device including a processor, such as a camera or positioning sensor may share data signals with other lower level devices, such as near field detection devices having lower processing capabilities.

FIG. 4 is a graphical representation of waveforms for a HFAC power signal and a pulse-based modulation scheme. Waveforms 400 include primary side AC voltage ($v_p$) 405, modified current ($i_{pm}$) waveform 410, and current pulses ($i_{inj}$) 415. Primary side AC voltage ($v_p$) 405 may be used as a synchronized clock. According to embodiments, a current pulse, which represents a data bit, is generated in each half cycle of $v_p$. Polarity of the current pulse may be determined according to a bit value, such that a negative pulse represents a logical "0" and a positive pulse represents a logical "1." By injecting pulse current into the primary side, the data is superposed on the power current $i_p$. Data bits $420_{1-n}$ are shown for current pulses 415. Thus, the data and power can be transferred to secondary side through same capacitive channel. As such, a synchronized clock is embedded in the data stream and each data bit is represented by a pulse which is short enough to allow for high-rate data transfer.

FIG. 5 depicts a graphical representation of a data modulation circuit 500. Control module 505 is employed to control the data modulation circuit to inject the pulse current $i_{inj}$ into a primary side. Control module 505 is configured to receive data 506 for transmission to a device from a central controller or other processor. With respect to FIG. 5, the switching of the illustrated MOSFETs (S1-S6) causes edges to be formed in the HFAC signal, these edges may be interpreted as data.

FIG. 5 represents the application and removal of the injector current $i_{inj}$. In a first mode of operation, switch S1 is closed and switch S2 is open, which allows a modulation voltage vin to be applied to the HFAC voltage signal vp and thus an injector current $i_{inj}$ to HFAC current signal. When switch S1 is open and switch S2 is closed, the modulation voltage vin is removed thus removing the injector current $i_{inj}$. This switching causes an edge to be formed in the HFAC signal as represented by the red waveform showing the red modified current waveform $i_p$. The injector current waveform may be an edge in the positive side of a HFAC signal that is interpreted as a logic "1" and an edge in the negative side of the HFAC signal is interpreted as a logic "0".

Figure 6:
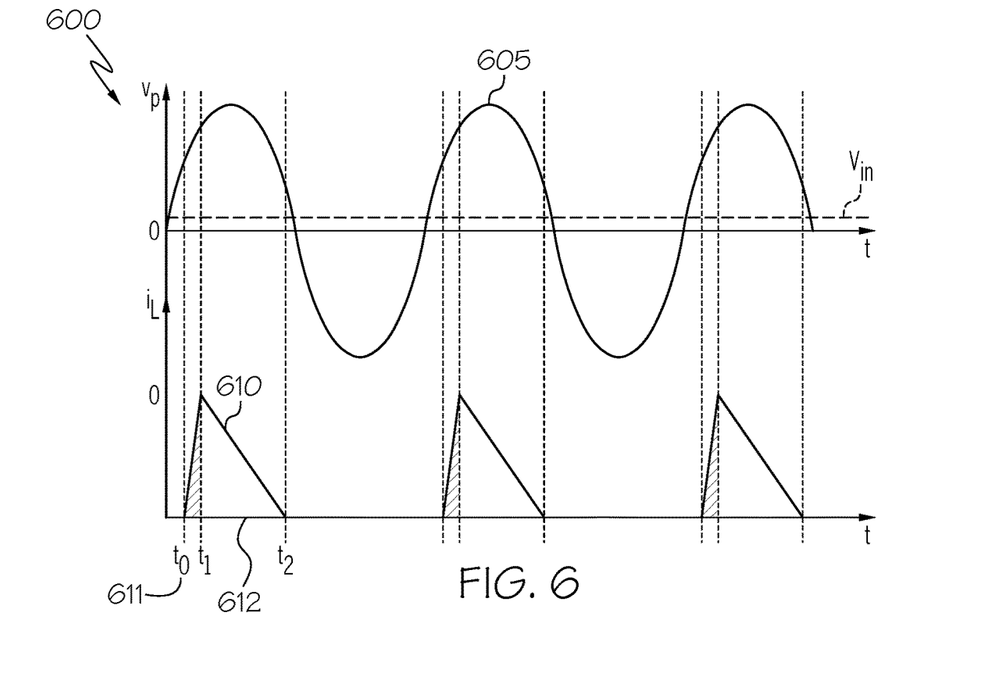
FIG. 6 depicts a graphical representation of example waveforms of a data modulation circuit, according to embodiments described herein.

Control module 505 may also receive sensed primary side AC voltage $v_p$ and inductor current $i_L$. Control module 505 may utilize a look-up table strategy to output control signals 508 (e.g., MOSFET S1 to S8) based on the value of $v_p$, $i_L$ and transferred data. Exemplary look-up table values are shown in Table 1.

period [$t_0 \sim t_1$] 611, the inductor voltage $v_L = v_p - v_{in} > 0$, and thus $i_L$ is increased from 0. Therefore, the data modulation circuit injects negative pulse current $i_{inj} = -i_L$ to the primary side. In other words, the data bit='0' can be superposed on the power current $i_p$.

Step 2: When $i_L$ is increased to $i_{L\_max}$, $S_1$ is off and $S_6$ is on (Here, $i_{L\_max}$ is a constant value and preset in the control module). As shown in FIG. 5, the inductor current flows through $D_7$, $v_{in}$, $S_6$, $D_5$, and L. During period [$t_1 \sim t_2$] 612, the inductor voltage $v_L = -v_{in}$. Thus, $i_L$ is decreased from $i_{L\_max}$ max to 0, as shown in FIG. 5. The data modulation circuit doesn't inject any current to the primary side during time $t_1 \sim t_2$ associated with period 612.

Figure 7:
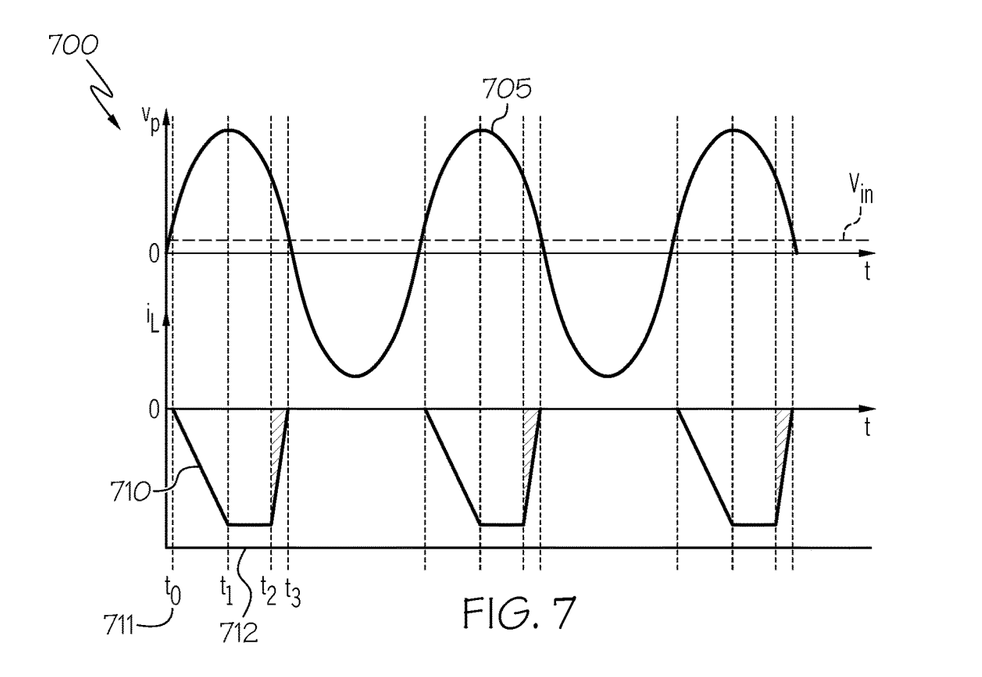
FIG. 7 depicts a graphical representation of example waveforms of an example data modulation circuit, according to embodiments described herein.

FIG. 7 depicts a graphical representation of waveforms of a data modulation circuit. Waveforms 700 include primary side AC voltage ($v_p$) 705, and inductor current ($i_L$) 710.

Mode 2: $v_p > 0$ and Data='1'

Step 1: Only $S_5$ and $S_7$ is on, the inductor current flows through $S_5$, $D_6$, $v_{in}$, $S_7$, and L. During this period [$t_0 \sim t_1$] 711, the inductor voltage $v_L = -v_{in}$, thus the inductor current $i_L$ is decreased from 0, as shown in FIG. 7. It can be seen from FIG. 7 that the data modulation circuit doesn't inject any current to the primary side during this time.

Step 2: When $i_L$ is decreased to $-i_{L\_max}$, $S_7$ is off and $S_5$ is on (Here, $-i_{L\_max}$ is a constant value and preset in the control module). The inductor current flows through $S_5$, $D_6$, $D_8$, and L. Since the inductor voltage $v_L = 0$ during this period [$t_1 \sim t_2$] 711, the inductor current keeps unchanged. The data modulation circuit doesn't inject any current to the primary side during this time.

Step 3: When $v_p = V+$, $S_2$ is on and $S_5$ is off. The inductor current flows through $S_2$, $D_1$, $v_p$, $D_8$, and L. During this period [$t_2 \sim t_3$], the inductor voltage $v_L = v_p - v_{in}$, thus $i_L$ is

TABLE 1

|  | $v_p > 0$ | $v_p < 0$ |
|---|---|---|
| Data = "0" | Mode 1<br>Step 1: If $v_p > V_+$, then only $S_1$ is on.<br>Step 2: When inductor current $i_L$ is increased to $i_{L\_max}$, $S_1$ is off and $S_6$ is on. | Mode 3<br>Step 1: If $v_p < V_-$, only $S_2$ and $S_8$ is on.<br>Step 2: When inductor current $i_L$ is increased to $i_{L\_max}$, S2 is off and $S_4$ is on. |
| Data = "1" | Mode 2<br>Step 1: Only $S_5$ and $S_7$ is on.<br>Step 2: When $i_L$ is decreased to $-i_{L\_max}$, $S_7$ is off and $S_5$ is on.<br>Step 3: When $v_p = V_+$, $S_2$ is on and $S_5$ is off. | Mode 4<br>Step 1: Only $S_3$ and $S_8$ is on.<br>Step 2: When $i_L$ is decreased to $-i_{L\_max}$, $S_3$ is off and $S_1$ is on.<br>Step 3: When $v_p = V_-$, $S_1$ is off and $S_6$ is on. |

The look-up table values of Table 1 provide multiple modes of operation including modes 1 and 3 for output of a logical "0" and modes 2 and 4 for output of a logical "1".

As shown in Table 1, according to the polarity of the primary side voltage $v_p$ and the transferred data bit, the data modulation circuit has 4 operation modes: 1) $v_p > 0$ and data='0', 2) $v_p > 0$ and data='1', 3) $v_p < 0$ and data='0', and 4) $v_p < 0$ and data='1'.

FIG. 6 depicts a graphical representation of waveforms of a data modulation circuit. Waveforms 600 include primary side AC voltage $v_p$ 605 and inductor current $I_L$ 610. Waveform 600 may relate to an example of Mode 1.

Mode 1: $v_p > 0$ and Data='0'.

Step 1: When $v_p = V+$, $S_1$ is on, while $S_2$ to $S_8$ are turns off (Here, V+ is a constant value and preset in the control module). The inductor current $i_L$ flows through $v_p$, $S_1$, $D_2$, L, $D_7$, and $v_{in}$, as shown in FIG. 5. As shown in FIG. 6, during increased from $-i_{L\_max}$ to 0. It can be seen that the data modulation circuit injects positive pulse current to the primary side. In other words, the data bit='1' can be superposed on the power current $i_p$.

Figure 8:
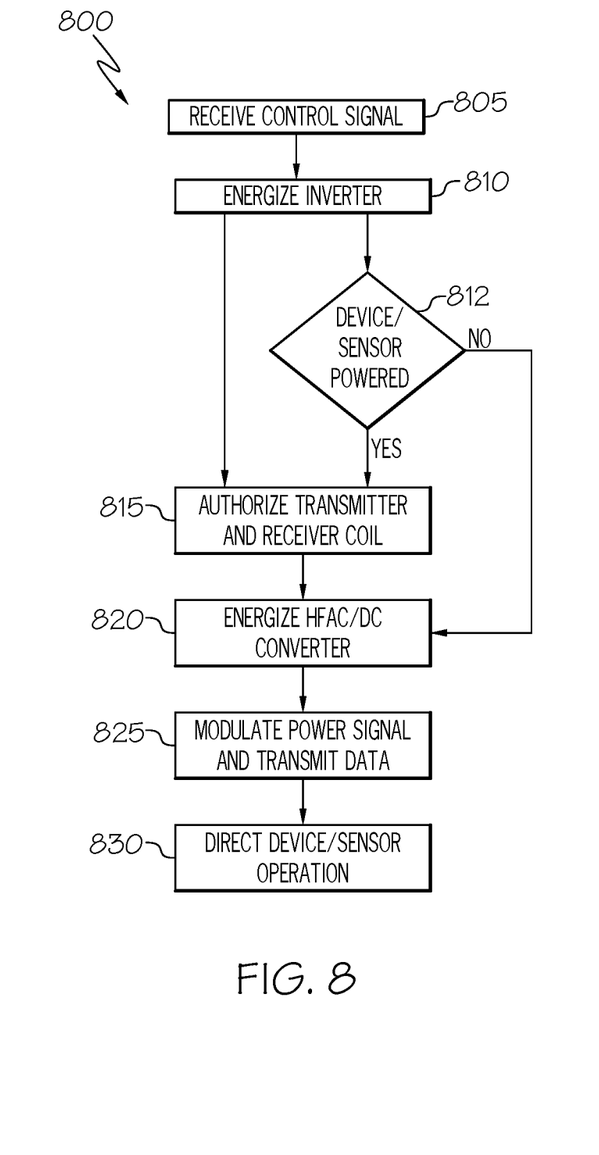
FIG. 8 depicts a graphical representation of an example process to activate a vehicle device, according to embodiments described herein.

FIG. 8 depicts a graphical representation of a process to activate a vehicle device according to one or more embodiments described. Process 800 may be performed by one or more components of systems described herein to activate and/or control one or more devices. Process 800 may be initiated by receiving a control signal at block 805. A controller (e.g., controller 110, controller 310, etc.) may receive a control signal al block 805 from a vehicle control unit (e.g., ECU) for operation of at least one vehicle device. At block 810 the controller can energize an HFAC inverter associated with the device (e.g., HFAC inverter 155A for device $125_1$). By energizing the HFAC inverter, DC power of the battery unit can be converted to a HFAC signal.

Process 800 may optionally determine if devices (e.g., sensors) are powered through receivers at block 812. Certain devices may include onboard receivers while other devices may be powered through receivers. If the device is powered through a receiver (e.g., "YES" path out of decision block 812, process 800 can authorize transmitter and receiver coils at block 815. Process 800 may then include energizing the HFAC DC converter of a receiver at block 820. If the device is not powered through a receiver (e.g., "NO" path out of decision block 812, process 800 can energize the HFAC inverter/DC converters of the device at block 810.

At block 825, process 800 includes modulating a power signal to provide data. At block 830, a controller of a system can direct operation of the device. Devices having multiple functions, such as sensing, communication, etc. may be controlled such that one or more operations and modes may be activated or deactivated. Directing device operation at block 830 may include deactivating at least one of a sensor and device capability. One example of directing device operation may include activating sensors, such as parking assist sensors or lane change sensors based on an operating condition of a vehicle. In response to a detected driving condition a controller of a vehicle may generate a data signal for integration with an HFAC power signal to activate devices and sensors for the driving operation.

Figure 9:
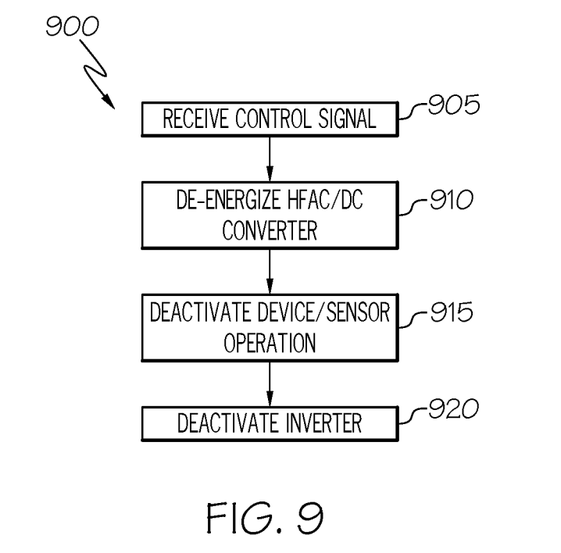
FIG. 9 depicts a graphical representation of an example process to deactivate a vehicle device, according to embodiments described herein.

FIG. 9 depicts a graphical representation of a process to deactivate a vehicle device. Process 900 may be performed by one or more components of systems described herein to deactivate one or more devices. Process 900 may be initiated by receiving a control signal at block 905. A controller (e.g., controller 110, controller 310, etc.) may receive a control signal al block 905 from a vehicle control unit (e.g., ECU) for operation of at least one vehicle device. The control signal may include a command to deactivate power to a vehicle device. At block 910 the controller can de-energize an HFAC inverter/DC converter to the device. At block 915 process 900 includes deactivating operation of a device. At block 920, process 9320 can deactivate an inverter.

Figure 10:
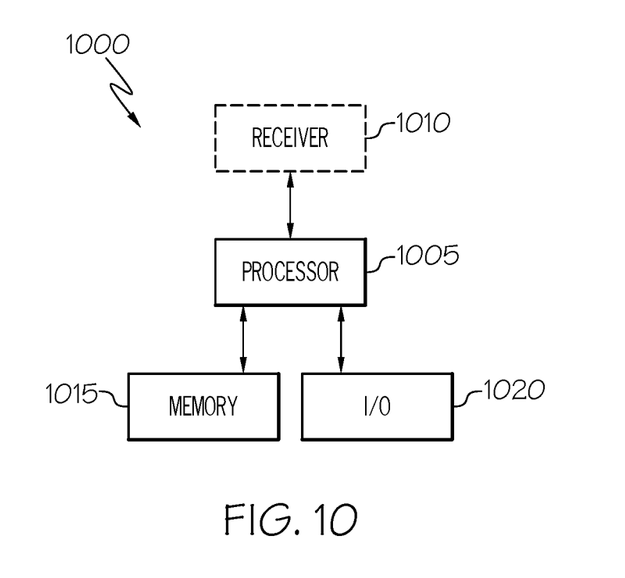
FIG. 10 depicts an example controller, according to embodiments described herein.

FIG. 10 depicts a graphical representation of a controller 1000, according to embodiments described herein. Controller 1000 includes processor 1005, memory 1015 and input/output block 1020. Controller 1000 may optionally include receiver 1010. Controller 1000 may relate to a vehicle control unit to control operation of wireless power transfer to vehicle devices. Processor 1005 may be configured to execute one or more operations stored in memory 1015, such as processes for activating one or more vehicle devices or sensors. Processor 1005 may control wireless power output and data modulation. Processor 1005 may be coupled to memory 1015, I/O 1020 and receiver 1010. Processor 1005 may be configured to control activation of power to devices based on one or more inputs from I/O block 1020.

As illustrated above, various embodiments for HFAC power transfer systems and processes for wireless power transfer with data are disclosed. Embodiments provide system configurations to provide power to one or more regions and/or sets of devices. Embodiments include configurations that reduce the use of wires and connections to provide data for sensors.

Systems and methods are provided for wireless HFAC power transfer system in a vehicle. Systems and methods may also integrate data with power transmission by modulating a data signal on an HFAC signal.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein includes systems, methods, and non-transitory computer-readable mediums for wireless power transfer. It should also be understood that these embodiments are merely exemplary and are not intended to limit the scope of this disclosure.

The invention claimed is:

1. A wireless power transfer system for a vehicle, the system comprising:
   a direct current (DC) electrical power source including at least one battery unit;
   a high-frequency alternating current (HFAC) inverter electrically coupled to the DC electrical power source;
   a transmitter electrically coupled to the HFAC inverter; and
   a controller electrically coupled to the HFAC inverter and the transmitter, wherein the controller is configured to
      enable the HFAC inverter and the transmitter,
      control the transmitter to generate a data signal,
      control the HFAC inverter and the transmitter to wirelessly transmit a HFAC power signal to at least one device of a vehicle, and
      wherein:
         the data signal is superimposed on the transmitted HFAC power signal, and
         the HFAC power signal provides wireless power to the at least one device.

2. The wireless power transfer system of claim 1, wherein the at least one battery unit is coupled to the HFAC inverter by a transmission line.

3. The wireless power transfer system of claim 1, wherein the HFAC inverter converts DC power received from the at least one battery unit to a high frequency AC power signal.

4. The wireless power transfer system of claim 1, wherein the transmitter is configured to generate a high frequency electric field to wirelessly power the at least one device.

5. The wireless power transfer system of claim 1, wherein the transmitter includes a data modulation circuit using a pulse current source to inject a pulse current to the HFAC power signal to superimpose the data signaler on the transmitted HFAC power signal.

6. The wireless power transfer system of claim 1, wherein controlling the HFAC inverter and the transmitter for wireless power output includes activating the at least one device of the vehicle.

7. The wireless power transfer system of claim 1, further comprising at least one additional high-frequency alternating current (HFAC) inverter electrically coupled to the DC electrical power source and at least one additional transmitter electrically coupled to the at least one additional HFAC inverter, wherein the at least one additional HFAC inverter and the at least one additional transmitter provide an additional HFAC power signal to provide and data to at least one additional device of a vehicle.

8. The wireless power transfer system of claim 1, wherein the data signal activates the at least one device of the vehicle for operation.

9. The wireless power transfer system of claim 1, wherein the controller is configured to deactivate power to the at least one device of the vehicle.

10. A vehicle system comprising:
a direct current (DC) power source including at least one battery unit;
a high-frequency alternating current (HFAC) inverter electrically coupled to the DC power source;
a transmitter electrically coupled to the HFAC inverter;
at least one device; and
a controller electrically coupled to the HFAC inverter and the transmitter, wherein the controller is configured to enable the HFAC inverter and the transmitter,
control the transmitter to generate a data signal,
control the HFAC inverter and the transmitter to wirelessly transmit a HFAC power signal to the at least one device of a vehicle, and
wherein:
the data signal is superimposed on the transmitted HFAC power signal, and
the HFAC power signal provides wireless power to the at least one device.

11. The vehicle system of claim 10, wherein the at least one battery unit is coupled to the HFAC inverter by a DC transmission line, and wherein the DC transmission line is coupled to a plurality of HFAC inverters.

12. The vehicle system of claim 10, wherein the HFAC inverter converts DC power received from the at least one battery unit to a high frequency AC power signal.

13. The vehicle system of claim 10, wherein the transmitter is configured to generate a high frequency electric field to wirelessly power the at least one device.

14. The vehicle system of claim 10, wherein the transmitter includes a data modulation circuit using a pulse current source to inject a pulse current to the HFAC power signal to superimpose the data signal on the transmitted HFAC power signal.

15. The vehicle system of claim 10, wherein controlling the HFAC inverter and the transmitter for wireless power output includes activating the at least one device of the vehicle.

16. The vehicle system of claim 10, further comprising at least one additional high-frequency alternating current (HFAC) inverter electrically coupled to the DC power source and at least one additional transmitter electrically coupled to the at least one additional HFAC inverter, wherein the at least one additional HFAC inverter and the at least one additional transmitter provide an additional HFAC power signal to provide and data to at least one additional device of a vehicle.

17. The vehicle system of claim 10, wherein the data signal activates the at least one device of the vehicle for operation.

18. The vehicle system of claim 10, wherein the controller is configured to deactivate power to the at least one device of the vehicle.

19. The vehicle system of claim 10, wherein the at least one device comprises at least one of a sensor, camera and vehicle device in general.

20. A method for controlling wireless power transfer for a vehicle, the method comprising:
enabling, by a controller, a high-frequency alternating current (HFAC) inverter electrically coupled to a DC power source and a transmitter electrically coupled to the HFAC inverter;
controlling the transmitter to generate a data signal;
controlling, by the controller, the HFAC inverter and the transmitter to wirelessly transmit a HFAC power signal to at least one device of a vehicle;
wherein:
the data signal is superimposed on the transmitted HFAC power signal, and
the HFAC power signal provides wireless power to the at least one device.

* * * * *

UNITED STATES PATENT AND TRADEMARK OFFICE
CERTIFICATE OF CORRECTION

PATENT NO. : 11,938,875 B2
APPLICATION NO. : 17/164166
DATED : March 26, 2024
INVENTOR(S) : Yanghe Liu et al.

It is certified that error appears in the above-identified patent and that said Letters Patent is hereby corrected as shown below:

On the Title Page

On page 2, Column 1, item (56), U.S. patent documents, cite no. 1, delete "Okamura" and insert --Okamura et al--, therefor.

On page 2, Column 1, item (57), abstract, Line(s) 8, delete "includes" and insert --include--, therefor.

In the Specification

In Column 4, Line(s) 54, after "the range of", delete "50 H" and insert --50 Hz--, therefor.

In Column 5, Line(s) 25, delete "charged" and insert --charge--, therefor.

In Column 5, Line(s) 67, delete "converted" and insert --convert--, therefor.

In Column 6, Line(s) 25, delete "descried" and insert --described--, therefor.

In Column 7, Line(s) 14, after "multiple", delete "device" and insert --devices--, therefor.

In Column 8, Line(s) 6, before "AC to DC", delete "a" and insert --an--, therefor.

In Column 8, Line(s) 32, after "which", insert --is--.

In Column 12, Line(s) 7, delete "includes" and insert --include--, therefor.

In the Claims

In Column 12, Line(s) 4, Claim 5, after "the data", delete "signaler" and insert --signal--, therefor.

Signed and Sealed this
Seventh Day of May, 2024

Katherine Kelly Vidal
*Director of the United States Patent and Trademark Office*